Jan. 8, 1924.  1,480,035

O. S. WARRICK ET AL

VEHICLE EXTRICATING DEVICE

Filed Sept. 3, 1921

Orange S. Warrick.
Shadrach H. Houghton.
INVENTOR

BY Victor J. Evans
ATTORNEY

WITNESS:
C. Nye Fraser Jr.

Patented Jan. 8, 1924.

1,480,035

UNITED STATES PATENT OFFICE.

ORANGE S. WARRICK AND SHADRACH H. HOUGHTON, OF HOWARD, KANSAS.

VEHICLE EXTRICATING DEVICE.

Application filed September 3, 1921. Serial No. 498,292.

*To all whom it may concern:*

Be it known that ORANGE S. WARRICK and SHADRACH H. HOUGHTON, citizens of the United States, residing at Howard, in the county of Elk and State of Kansas, have invented new and useful Improvements in Vehicle Extricating Devices, of which the following is a specification.

This invention relates to attachment for motor vehicles, particularly to extricating devices, and has for its object the provision of a windlass device adapted to be secured upon the hubs of the rear wheels of an automobile whereby to wind thereon cables or ropes which are secured at one end to a spoke and which have their other ends secured to posts or stakes anchored in the ground in front of or in back of the automobile, as the case may be, the construction being such that when the rear wheels of a stalled automobile are driven, the winding of the cables onto the drums will result in pulling the machine out of the mud hole or the like.

An important object is the provision of a device of this character in which the drums fit snugly upon the hubs and are held in position only by the cables, each cable having one end hooked onto a spoke of the associated wheel and then being wrapped a couple of times about the drum to secure the latter.

An additional object is the provision of a device of this character which will be simple and inexpensive in manufacture, very easy to apply or remove, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
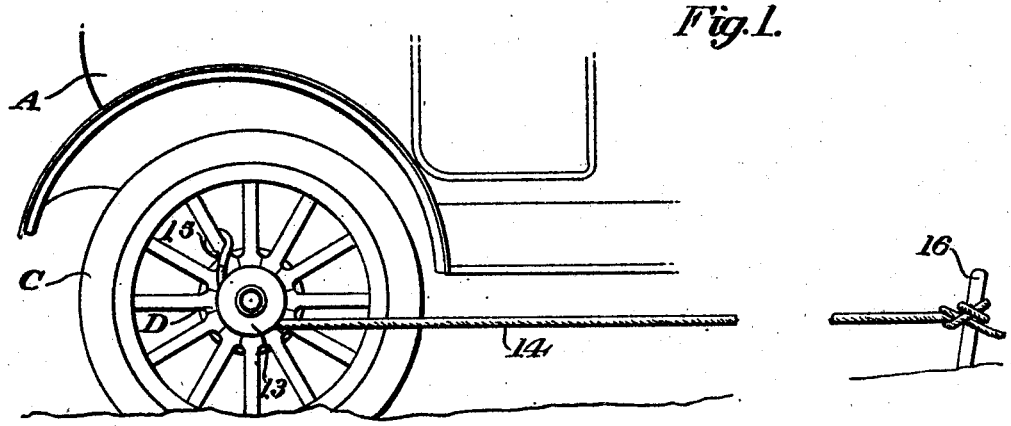
Figure 2:
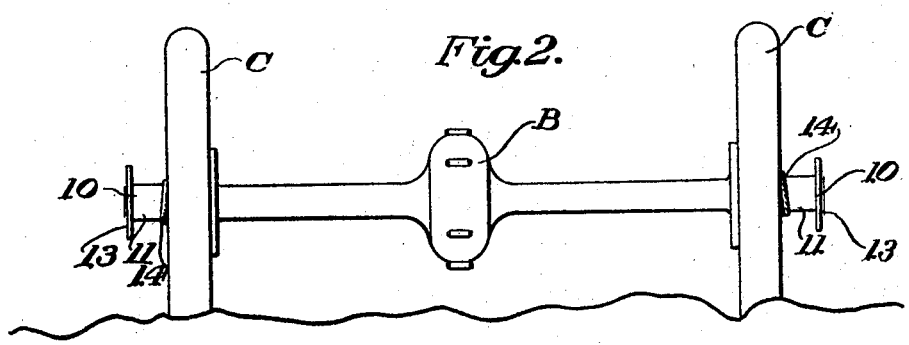
Figures 3, 4:
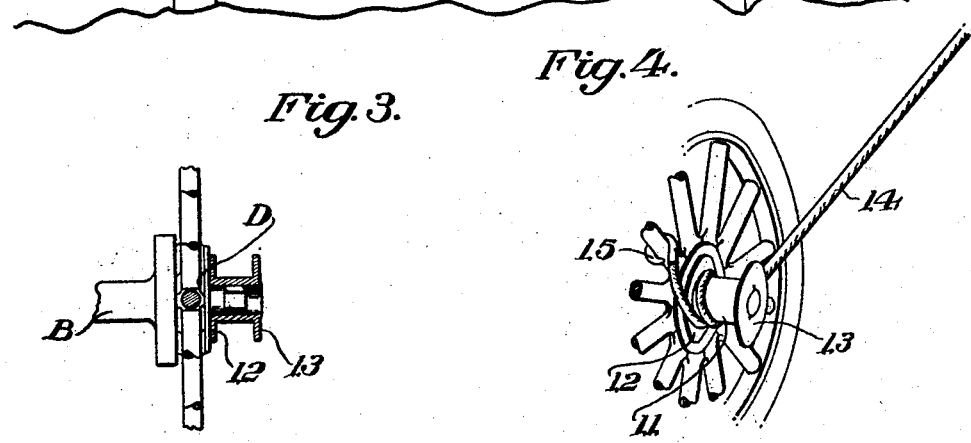

Figure 1 is a side elevation of an automobile showing our device applied thereto, Figure 2 is a rear elevation, Figure 3 is a sectional view through our device applied to one rear wheel, and Figure 4 is a detail perspective view of our device and a portion of a rear wheel showing the arrangement of the cable for holding the drum in position.

Referring more particularly to the drawings, the letter A designates a portion of an automobile, B designates the rear axle housing thereof, C designates the rear wheels, and D the hubs thereof.

In carrying out our invention we provide a pair of drums 10 which are disposed on the outside of each rear wheel and associated with the hub thereof. Each of these drums comprises a cylindrical body portion 11 provided at one end with an outwardly extending flange 12 disposable against the wheel and provided at its other end with a similar outwardly extending flange 13 to serve as retaining means. These flanges may be formed integrally upon the body 11, as by casting the entire device, or they might be welded or otherwise secured to the body. The body 11 is formed hollow for at least a portion of its length so as to receive the cap of the rear hub with the flange 12 fitting snugly against the wheel.

The numeral 14 designates a rope or cable which has one end carrying a hook 15 which is engageable upon a spoke, as shown. The numeral 16 designates a suitable stake or post which is adapted to be driven into the ground in front or in back of the automobile, as the case may be.

In the use of our device we employ a pair of the drums 10, one for each rear wheel and these drums are simply slipped over the hubs with the flanges 12 against the wheels. Each rope is then hooked onto a spoke and is given a few turns about the body of the drum to hold the drums in position, and the other ends of the ropes are secured to the stakes or posts 16. When the motor of the vehicle is set in operation and the clutch thrown in to rotate the rear wheels, it is apparent that the drums will rotate and will wind up the ropes and this will naturally cause the vehicle to pull itself out of the mud hole, ditch, or other place where it may happen to be stalled.

From the foregoing description and a study of the drawings it will be apparent that we have thus provided a simply constructed and consequently inexpensive device by means of which an automobile may be extricated by its own power and without any strain upon the working parts, the device being so constructed that it may be very easily slipped in place and held without the employment of any tools or securing devices. Another important feature is that after the parts of the device are assembled and properly arranged no further attention is necessary and the entire operation requires the services of only a single person in contra-distinction to somewhat similar devices which, however, require the combined efforts of two operators.

While we have shown and described the preferred embodiment of our invention, it is of course to be understood that we reserve the right to make such changes in the form, construction and arangement of parts as will not depart from the spirit of the invention or the scope of the subjoined claim.

Having thus described our invention, we claim:

A vehicle extricating device comprising a drum adapted for engagement upon the outside of a rear wheel of a motor vehicle, the drum having a bore conformingly receiving and fitting closely upon the hub cap of the wheel, and a cable adapted to have one end secured to a stationary support and having its other end carrying a hook engageable upon one of the wheel spokes, the cable being initially given a few turns about the drum whereby to maintain tension on the cable between the drum and the spoke engaged by the hook, this tension and the close fit of the drum upon the hub being the sole means for retaining the drum in position.

In testimony whereof we affix our signatures.

ORANGE S. WARRICK.
SHADRACH H. HOUGHTON.